Figure 1:
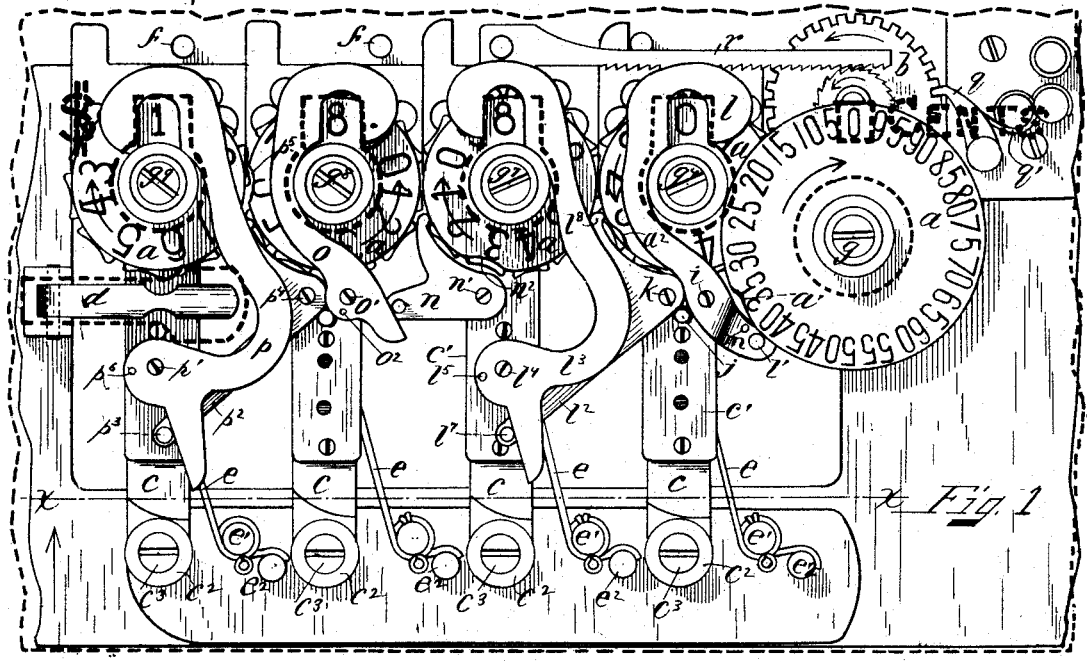

(No Model.) 2 Sheets—Sheet 1.

W. KOCH.
REGISTERING MECHANISM.

No. 506,122. Patented Oct. 3, 1893.

Witnesses
E. L. Harlow.
A. F. Acton

Inventor
William Koch
By E. C. Gilman
J. S. Rush
Attys (No Model.) 2 Sheets—Sheet 2.
W. KOCH.
REGISTERING MECHANISM.
No. 506,122. Patented Oct. 3, 1893.
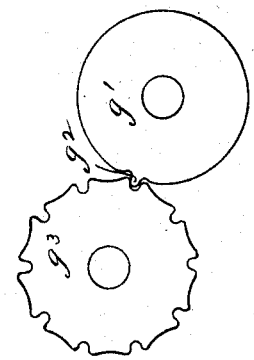
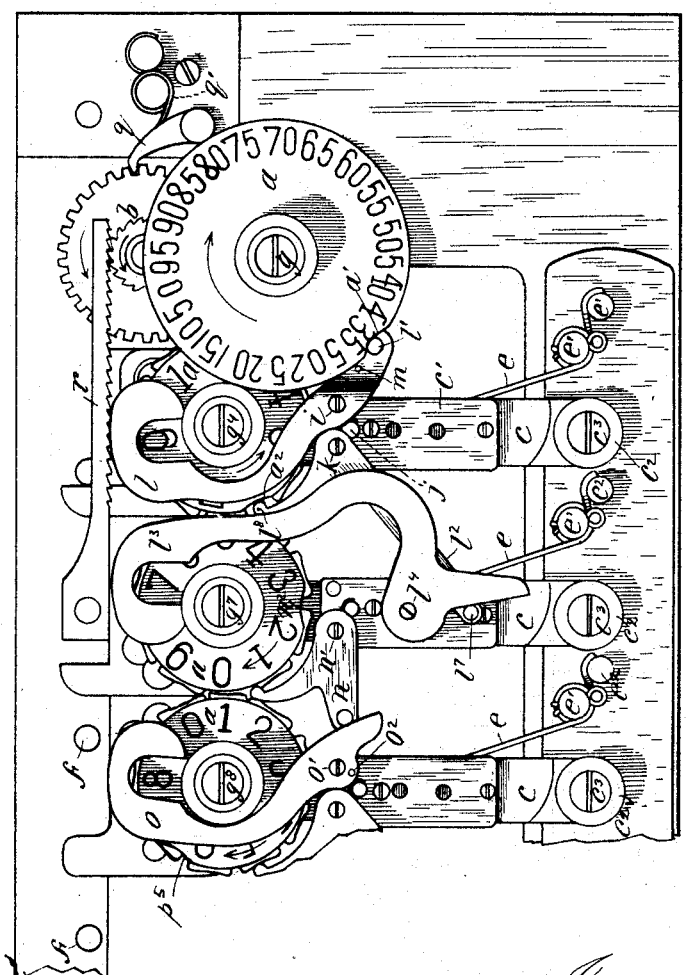
Witnesses:
E. L. Harlow
A. F. Acton
Inventor:
William Koch
By E. C. Siemon
J. S. Ryork
Atty

UNITED STATES PATENT OFFICE.

WILLIAM KOCH, OF NEW YORK, N. Y., ASSIGNOR, BY MESNE ASSIGNMENTS, TO THE NATIONAL CASH REGISTER COMPANY, OF DAYTON, OHIO.

REGISTERING MECHANISM.

SPECIFICATION forming part of Letters Patent No. 506,122, dated October 3, 1893.

Application filed May 19, 1892. Serial No. 433,511. (No model.)

*To all whom it may concern:*

Be it known that I, WILLIAM KOCH, of New York, in the county of New York and State of New York, have invented a new and useful Improvement in Registering Mechanism, of which the following, taken in connection with the accompanying drawings, is a specification.

The invention relates to that class of registering mechanisms in which the primary wheel of the train at each of its complete revolutions turns the secondary wheel one number, to indicate upon it the revolution of the primary wheel, and in which each wheel likewise actuates its immediately succeeding wheel at each complete revolution, for the same purpose.

It relates more particularly to registering mechanisms in which the primary wheel advances in twentieths of a revolution while the succeeding wheels move in tenths of revolutions. In many forms of registering machines the primary wheel co-operates with and is actuated by a series of operating keys whose values represent multiples of five, and the primary wheel bears a 0 and a series of nineteen numbers representing multiples of five from 5 to 95 inclusive. Such wheel is adapted to register one dollar by a complete revolution, and at such complete revolution to actuate its co-operating secondary wheel and turn the latter one-tenth of a revolution to add a unit upon it, the 0 upon the primary wheel being simultaneously brought to the reading point. The secondary wheel, as before stated, moves in tenths of a revolution, and bears upon its face the nine digits and a cipher. It is therefore necessary that it shall be turned a full tenth of a revolution at each complete revolution of the primary wheel, but inasmuch as the primary wheel may be advanced only one-twentieth of a revolution at a given operation, as where the five-cent key is operated, it will not be possible for the primary wheel at such operation to turn the secondary wheel more than a twentieth of a revolution. It is therefore necessary that the primary wheel be arranged to turn the secondary wheel slightly before the primary wheel quite completes a revolution, so that at the full completion of its revolution it may have turned the secondary wheel a full tenth of a revolution and brought the proper number upon such secondary wheel to the reading point. It is therefore usual to arrange the primary wheel to slightly move the secondary wheel when the primary wheel completes nineteen-twentieths of its revolution and brings its number 95 to the reading point, and then to turn the secondary wheel the remaining portion of its movement when the primary wheel is again advanced and completes its full revolution. Now, it results from this that when the primary wheel has completed nineteen-twentieths of its revolution and its number 95 has been brought to the reading point, the secondary wheel will have been turned slightly and the number previously exhibited by it moved a greater or less distance away from the reading point, and perhaps more or less hidden from view, and the next succeeding higher number brought toward the reading point and perhaps partly exposed to view. This is liable to occasion confusion by reason of the uncertainty as to which of the two numbers upon the secondary wheel which are adjacent the reading point indicates the actual registration. Thus, if the primary and secondary wheels indicate a registration of three dollars and a half and the forty-five-cent key be operated the primary wheel will be turned until its number 95 is brought to the reading point, and the secondary wheel will also be moved and its number 3 carried slightly away from the reading point and its number 4 brought toward the reading point, so that part or all of both the numbers 3 and 4 may be exposed. This leaves it uncertain as to whether the actual registration is three dollars and ninety-five cents, or four dollars and ninety-five cents. It is the object of my invention to remove this uncertainty and prevent this confusion in taking readings from the register, by combining with the registering wheels a series of automatically operating screen plates, one for each wheel except the primary, and each actuated by or co-operating with the preceding wheel in the series in such manner as to expose at the reading point only the numbers which indicate the actual registration.

In the accompanying drawings I have illustrated the invention as applied to the registering mechanism of a well known form of cash register and indicator now upon the market, though it will be understood that it is applicable to many other forms of registering devices.

Figure 2:
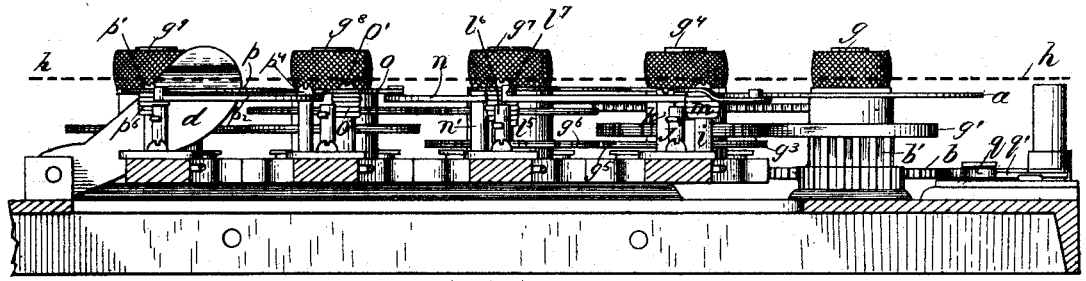
Figure 3:
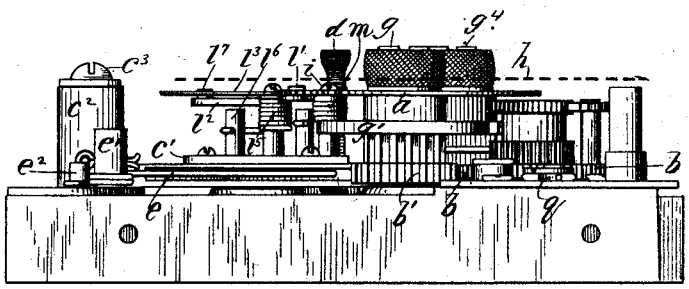

In said drawings Figure 1 is a plan view of a train of registering wheels having my automatic screen plates combined with them; Fig. 2 a vertical section of the same; Fig. 3 an end view of the parts shown in Fig. 1; Fig. 4 a plan view corresponding to Fig. 1 but with the parts in different position; and Fig. 5 a detail plan view of the co-operating disks of the primary and secondary wheels.

The same letters of reference are used to indicate identical parts in all the figures.

The primary registering wheel $a$ is mounted upon a vertical bearing $g$ and has secured to its hub a pinion $b'$ which meshes with the master wheel $b$ of the train, said master wheel being actuated in the usual or any suitable manner by the operations of the machine, as by the ratchet bar $r$ engaging the ratchet wheel fast upon its upper side. The primary wheel $a$ bears upon its face in circular order near its edge nineteen numbers representing multiples of five from 5 to 95 inclusive, with a 0 between the 5 and 95. The numbers upon this primary wheel are adapted to be exposed singly at a sight opening in the plate of the casing above the registering wheels, said opening being indicated by dotted lines in Fig. 1, and the sight openings for the succeeding registering wheels being also indicated by dotted lines in said figure. The secondary and succeeding wheels in the train are mounted upon swinging arms $c$ pivoted to the framework at $c^3$. These arms are pressed toward the left by springs $e$ secured to the frame plate at $e'$ $e^2$, and are held in their normal right hand positions by a locking dog $d$ engaging the left hand arm $c$ of the series. In this position all of the registering wheels are in driving connection, each wheel being adapted to transfer its revolutions to the next succeeding wheel in the train in the manner common in the well known Geneva movement of this character. The transfer disk $g'$ which is fast to the hub of the primary wheel $a$ is shown in Fig. 5, where its tooth $g^2$ is engaged with one of the notches in the locking disk $g^3$ of the secondary wheel. When the dog $d$ is disengaged from the left hand arm $c$ the springs $e$ throw all of said arms to the left until their upper ends are arrested by contact with stops $f$ upon the framework, thereby separating the wheels to permit them to be singly reset to 0. Each of the arms $c$ in this instance has secured to its upper side a plate $c'$. Pivoted to the right hand arm $c$ or its plate $c'$, at $i$, is the screen plate for the secondary wheel, in this instance in the form of a curved or bent lever $l$ whose upper end is extended laterally across the reading opening of the secondary wheel and is cut away or provided with a recess co-incident with said opening. The upper end of this lever is pressed toward the right by a spring, not shown, which maintains a stud or pin $l'$ upon the lever in contact with the periphery of the primary registering wheel $a$. This wheel has a notch $a'$ in its periphery at one point, and when the wheel is turned until this notch is brought opposite the stud $l'$ the lower end of the lever is permitted to move slightly to the right and its upper end slightly to the left. The position of the notch $a'$ upon the wheel $a$ is such that it is brought opposite the stud $l'$ on the lever $l$ at the moment the number 95 upon said wheel is brought beneath the reading opening. At such time the transfer disk $g'$ of the primary wheel has engaged the notched disk $g^3$ of the secondary wheel, Fig. 5, and slightly turned said wheel, carrying toward the left the number upon the secondary wheel which had been previously exposed at the reading opening and bringing the next succeeding number toward that point. The movement of the upper end of the lever $l$ toward the left will carry the portion of it at the right of its recess over the new number which has been brought toward the reading point and hide it from view, leaving the old number fully exposed through its recess. Thus, if the sum of nine dollars and fifty cents has been indicated upon the secondary and primary wheels, and the primary wheel be then turned to add forty-five cents upon it, its number 95 will be brought to the reading point, and its notch $a'$ simultaneously brought opposite the stud $l'$ upon the lever $l$ and the upper end of said lever moved to the left as the secondary wheel moves in that direction, the parts assuming the position shown in Fig. 4, where it will be seen that the 0 upon the secondary wheel is completely hidden by the upper end of the lever $l$, while the number 9 which had been previously exposed is still left fully in view. If the primary wheel $a$ be now turned forward one-twentieth of a revolution and its 0 brought to the reading point the engagement of its periphery with the stud $l'$ upon the lever $l$ will throw the lower end of said lever to the left and its upper end to the right and the 0 upon the secondary wheel, which has now been brought directly under the reading opening, will be fully exposed through the recess in the upper end of the lever $l$ and the portion of the lever at the left of its recess will hide any part of the 9 which might otherwise be left exposed to view, the parts assuming the positions shown in Fig. 1.

The screen plates $l^3$, $o$ and $p$ co-operate with the third, fourth and fifth registering wheels in a similar manner, although the shape and arrangement of said screen plates are somewhat different from that above described. The screen plate $l^3$ for the third wheel is pivoted to the second arm $c$ at $l^4$ and is shifted by a bent lever $l^2$ which is pivoted at its angle to the first arm $c$ at $k$, bears at its upper end against the periphery of the secondary wheel $a$ and carries at its lower end a stud $l^7$ which engages a pendent portion of the plate $l^3$ beneath its pivotal point $l^4$. When the upper end of the lever $l^2$ is engaged with the notch in the secondary wheel $a$, as it is in Fig. 4, its stud $l^7$ is in extreme left hand position and permits the screen plate $l^3$ to move to the position shown in Fig. 4 under the influence of a suitable spring, the upper end of the plate $l^3$ in this position serving to hide the new number upon the third wheel which has been brought toward the reading point and its recess permitting the full exposure of the old number which has been slightly moved from said point. The notch $a^2$ in the secondary wheel is brought opposite the end of the lever $k$ when the secondary wheel has completed nineteen-twentieths of a revolution, and when it is turned forward its next twentieth of a revolution and its 0 brought to the reading point and the next succeeding number upon the third wheel brought directly beneath its reading opening the notch $a^2$ will be carried away from the upper end of the lever $k$ and the periphery of the wheel will force said end of the lever $k$ to the left, thereby throwing its lower end to the right and causing its stud $l^7$ to rock the plate $l^3$ and throw its upper end to the left, exposing the new number (8) to view and hiding any portion of the old number (7) which might otherwise have been left exposed; all as will be seen in Fig. 1.

The plate $o$ which co-operates with the fourth wheel $a$ is shifted by a triangular lever $n$ pivoted to the second arm $c$ at $n'$ and adapted to co-operate at its upper end with a notch $n^2$ in the periphery of the third registering wheel, said lever also carrying a stud bearing against the plate $o$.

The plate $p$ for the fifth wheel is actuated by a lever $p^2$ of the same shape and operating in the same manner as the lever $l^2$ which actuates the plate $l^3$ of the third wheel.

From the foregoing description it will be understood that whenever any one of the registering wheels completes nineteen - twentieths of a revolution the notch in its periphery will be brought into position to permit the screen plate for the next succeeding wheel to move into position to hide the number upon said wheel which is about to be brought to the reading point and to fully expose the old number which is being carried away from said point, and that when the first mentioned wheel is given a further twentieth of a revolution and the second wheel likewise a further twentieth of a revolution the screen plate for the second wheel will be moved back to initial position to expose the new number upon said wheel which has been brought to the reading point and to hide the old number which has been carried away from such point.

I am aware that it is not broadly new to combine screen plates with a train of registering wheels for this purpose, but,

Having thus fully described my invention, what I claim as new is—

In a registering mechanism, the combination of a primary registering wheel moving in twentieths of a revolution and adapted to register multiples of five from 5 to 95 inclusive, a secondary wheel intermittently actuated by the primary wheel and bearing the nine digits and a cipher and adapted to register units of dollars, and an automatic screen plate pivoted eccentric to the axis of the wheels and oscillating in one direction at the end of nineteen-twentieths of a revolution of the primary wheel, to hide from view the new number being brought to the reading point of the secondary wheel, and oscilating in the opposite direction at the end of the complete revolution of the primary wheel, to expose to view the new number upon the secondary wheel, substantially as described.

In testimony whereof I have signed my name to this specification, in the presence of two subscribing witnesses, on this 14th day of May, A. D. 1892.

WILLIAM KOCH.

Witnesses:
   PAUL MÜLLER,
   JOHN SAUNDERSON.